United States Patent [19]

Lin et al.

[11] Patent Number: 5,760,960
[45] Date of Patent: Jun. 2, 1998

[54] CASCADED SELF-INDUCED HOLOGRAPHY

[75] Inventors: Chih-Hsien Jason Lin, Hsinchu, Taiwan; Yu-Hwa Lo, Ithaca, N.Y.

[73] Assignee: Cornell Research Foundation, Inc., Ithaca, N.Y.

[21] Appl. No.: 694,477

[22] Filed: Aug. 7, 1996

Related U.S. Application Data

[63] Continuation-in-part of Ser. No. 445,113, May 19, 1995, abandoned.

[51] Int. Cl.$^6$ .................. G02B 5/18; G02B 27/44; G02B 1/04; G02B 6/34
[52] U.S. Cl. .................. 359/569; 359/566; 359/576; 359/34; 385/37
[58] Field of Search .................. 359/566, 569, 359/571, 573, 576, 577, 1, 34, 35; 430/1, 2, 321; 385/37

[56] References Cited

U.S. PATENT DOCUMENTS

| | | |
|---|---|---|
| 4,807,950 | 2/1989 | Glenn et al. |
| 5,029,154 | 7/1991 | Sumi et al. |
| 5,175,647 | 12/1992 | Gupta et al. |
| 5,238,785 | 8/1993 | Ohkura et al. |
| 5,258,871 | 11/1993 | Gupta. |
| 5,327,515 | 7/1994 | Anderson et al. |
| 5,340,637 | 8/1994 | Okai et al. |
| 5,368,992 | 11/1994 | Kunitsugu. |
| 5,422,745 | 6/1995 | Williams et al. |
| 5,434,708 | 7/1995 | Gupta et al. |
| 5,604,829 | 2/1997 | Bruesselbach ............ 359/569 |
| 5,633,966 | 5/1997 | Nakaishi ............ 359/569 |
| 5,652,818 | 7/1997 | Byron ............ 359/569 |

OTHER PUBLICATIONS

Lin, C. H. et al., "Gratings Fabricated by Cascaded, Self-Induced Holography for DFB Lasers", CLZO Conference, May 22, 1995, pp. 1–5.

*Primary Examiner*—Jon W. Henry
*Attorney, Agent, or Firm*—Jones, Tullar & Cooper

[57] ABSTRACT

Cascaded diffraction grated pairs are employed to form submicron gratings and other patterns in various types of devices using photolithographic, UV exposure and other techniques. Cascaded grating pairs are formed in masks which are positioned between a source of radiation and the device or substrate in which a grating is to be formed. The interaction of the diffracted beams generated by each diffraction grating in a cascade grating pair results in the device grating having a period which is substantially smaller than that of either of the gratings in the cascaded grating pair. As a result, gratings with substantially smaller periods than were previously obtainable can now be achieved using conventional fabrication techniques. To eliminate sensitivity to background exposure in photolithographic fabrication applications, a mask is employed in which first and second cascaded grating pairs are separated from one another by an opaque region that acts as a spatial filter. The mask is positioned above the target device or substrate at a distance which causes the diffracted radiation beams from each of the cascaded grating pairs to interfere with one another on the device in the area where the diffraction grating is to be formed.

22 Claims, 9 Drawing Sheets

CASCADED SELF-INDUCED HOLOGRAPHY

CROSS REFERENCE TO RELATED APPLICATION

This application is a continuation-in-part of application Ser. No. 08/445,113, filed May 19, 1995 now abandoned.

This invention was made with U.S. government support under Grant No. F49620-93-C-001 awarded by the U.S. Air Force. The government has certain rights in the invention.

BACKGROUND OF THE INVENTION

The present invention pertains, in general, to apparatus and methods for fabricating submicron optical gratings and other fine patterns in photoresist and other surfaces.

In the past, submicron optical gratings and other fine patterns were fabricated using conventional ultraviolet (UV) lithography and other radiation responsive methods. For many optical devices and instruments, gratings are indispensable features but are most difficult to form because of their fine dimensions and the relatively large areas to be covered. Grating formation is one of the most costly and tedious parts in processes for making optoelectronic devices such as Bragg reflectors, wavelength division multiplexers (WDMs), distributed-feedback (DFB) lasers and distributed Bragg reflected (DBR) lasers. Currently, electron-beam lithography, holographic phase mask and near field holography techniques are used for grating formation. Electron-beam lithography processes require a multimillion dollar capital investment on the part of the manufacturer, however, and they provide very low rates of production. Most of the prior art holographic techniques are also very sensitive to environmental changes and lack manufacturing flexibility.

None of the prior art techniques are ideal in terms of economy or efficiency. At present, a single 1.55 µm DFB laser (which contains thousands of submicron optical grating periods) may cost more than $5,000.00, while an E-beam written WDM DFB laser array prototype can sell for as much as $100,000.00 (according to the published prices provided by AT&T). It is the grating formation process step that contributes to the high cost of these devices, not the cost of the lasers. A CD player laser typically costs about one dollar.

Unless a low cost method for forming gratings (having submicron spacing between grating lines) becomes available, it will be impossible for important devices like the WDM DFB laser arrays to reach the market place in significant numbers. There is, at present, an unmet need for an economically viable grating fabrication technique which is useful in the fabrication of many key optical devices such as semiconductor DFB lasers, DBR lasers, WDM devices and fiber optic devices. With such a technique, one could form gratings for WDM devices at a much lower cost and with higher manufacturing throughput. WDM is considered one of the most promising techniques for advanced optical communication.

For the most demanding yet important high density WDM applications, the smallest wavelength spacing ($\Delta\lambda$) between two semiconductor laser sources is typically 2 nm. The difference in grating period ($\delta$) between these two sources is as small as 0.3 nm, since that difference is $\delta = \delta\lambda/2n_e$, where $n_e$ is the effective index of the semiconductor material. At present, the most advanced electron beam lithography is, at its limits, just able to achieve this resolution. The fact that no alternative process to E-beam lithography is able to satisfy the requirements for WDM devices has made the WDM laser array a mere laboratory curiosity. Replacing the costly E-beam lithography process with a low cost process would be a significant contribution to the commercialization of WDM laser sources.

SUMMARY OF THE INVENTION

To address the foregoing problems, the present invention provides a method and apparatus for fabricating submicron periodic gratings and other fine patterns in optical devices at a resolution well in excess of that which is achievable with conventional fabrication techniques. The heart of the invention resides in the use of a technique known as cascaded, self-induced holography in which multiple diffraction gratings are used in an optical mask in such a manner that optical gratings or patterns having grating spacings (periods) substantially smaller than the periods in the mask gratings are obtained. More particularly, the present invention employs an optical mask having at least two diffraction gratings which are cascaded in series, one beneath or in front of the other, between a radiation source and a device in or on which a grating is to be formed. The diffraction patterns generated by each of the mask gratings interact with one another so that the resulting diffraction grating formed on or in the device has a period a number of times (e.g. 4) smaller than the periods in either of the mask's diffraction gratings.

In its simplest form, the first and second cascaded diffraction gratings are disposed directly above or adjacent the surface of the optical device, such as an optical fiber array, in which an optical grating is to be formed. A monochromatic beam of light is passed through the cascaded gratings onto the surface of the device, thereby forming the optical grating therein with a period up to four times smaller than that of the period in the cascaded gratings. The period of the device grating can be reduced even further by employing multiple pairs of the cascaded grating pairs in series.

In one embodiment of the present invention, two pairs of cascaded optical gratings are disposed on either side of a central opaque region which acts as a spatial filter element, and minimizes sensitivity to background or noise exposure. The resulting mask is positioned between a substrate in which the optical grating is to be formed and a source of polarized monochromatic light. As the light passes through the first and second pairs of cascaded gratings, first and second respective diffracted beams are formed which interfere with one another under the central opaque region, thereby forming an interference grating on the surface of the substrate having a period of approximately one quarter of the period of the mask gratings. The spatial filtering effect of the opaque region is important in photolithography applications which are particularly background sensitive.

In another embodiment of the present invention, multiple pairs of adjacent cascaded gratings are employed for fabricating WDM or Raman laser amplifier devices, for example. Each adjacent grating is designed to generate an optical grating having a period slightly different from that of adjacent gratings to accommodate the different optical channels of a WDM device or the different phonon energy levels of the Raman laser amplifier. The slight differences in the periods of the fabricated gratings are preferably achieved by slightly offsetting the period in the first grating of the cascaded grating pair from that in the second grating.

BRIEF DESCRIPTION OF THE DRAWINGS

The foregoing and additional objects, features and advantages of the invention will become apparent to those of skill in the art from the following detailed description of a preferred embodiment, taken with the accompanying drawings, in which.

DETAILED DESCRIPTION OF THE PREFERRED EMBODIMENTS

Figure 1:
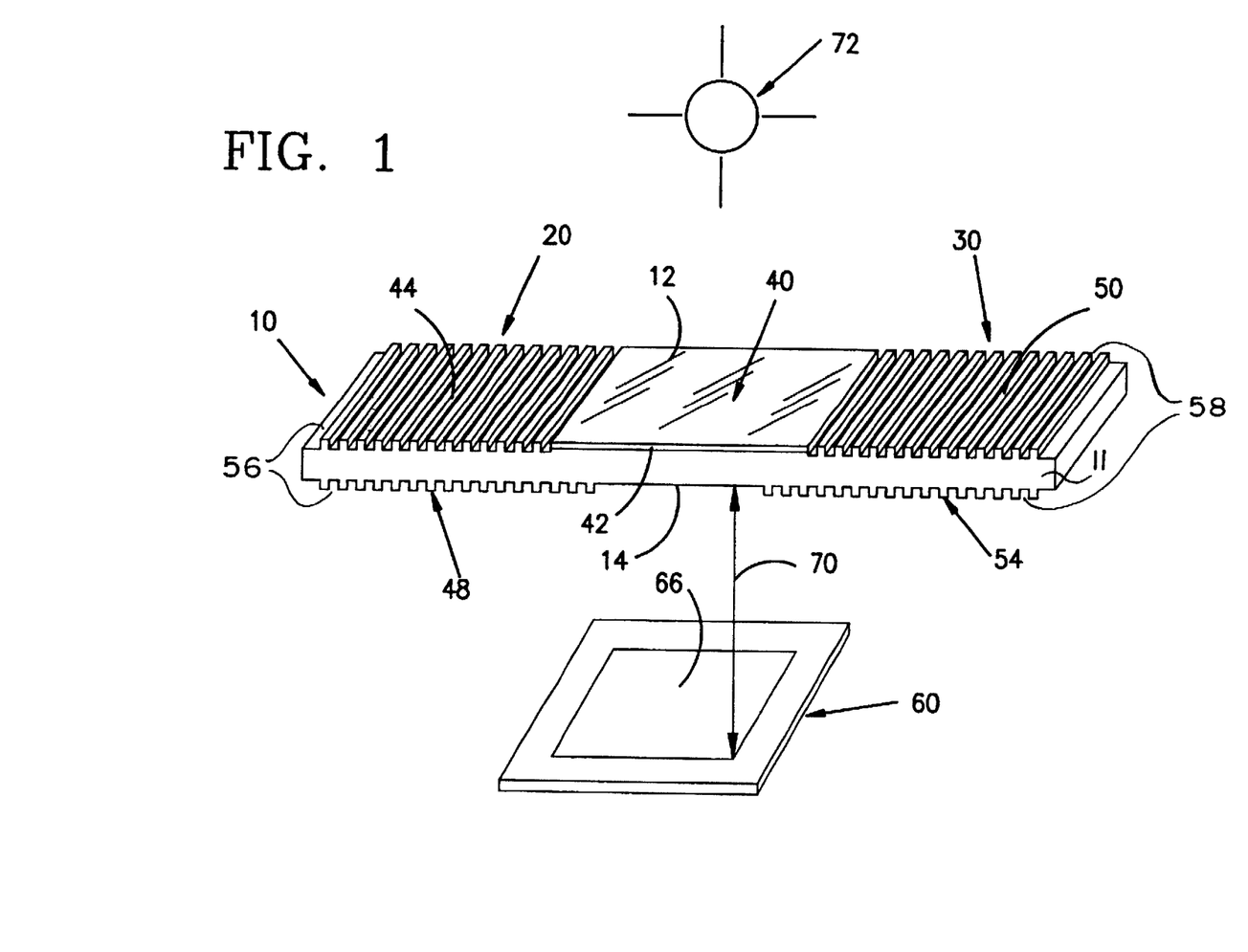
FIG. 1 is a diagrammatic perspective view of a mask constructed in accordance with a first embodiment of the present invention.

FIG. 1 illustrates a first embodiment of the present invention comprising a mask 10 formed in a substrate 11 having a top surface 12 and a bottom surface 14. First and second transparent end sections 20 and 30 are formed in the substrate 11 which are separated by a central opaque section 40. The substrate 11 is preferably fabricated from transparent material, such as glass, and the opaque central section 40 is preferably coated with a metal layer 42 of sufficient thickness to prevent transmission of light through the glass substrate 11. Conventional UV lithographic techniques are used to make first and second gratings 44 and 48 on the transparent end section 20, and gratings 50 and 54 the transparent end section 30.

The first and second gratings 44 and 48 form a first cascaded grating pair 56 and a second cascaded grating pair 58 is formed by the third and fourth gratings 50 and 54. Although the first through fourth gratings 44, 48, 50 and 54 are shown being formed on the top and bottom surfaces 12 and 14 of the substrate 11, it should be understood that the present invention is not limited to such a configuration. For example, multiple substrates could be employed for each grating, and the gratings could be formed either on the top or bottom surfaces of the substrates, as desired.

To form a grating on a semiconductor substrate 60, for example, the mask 10 is positioned over the semiconductor substrate 60 which is coated with a photoresist layer 66. The mask 10 is positioned parallel to the plane of the substrate 60 and is spaced apart therefrom by a distance 70 which is chosen so that only two desired beams (which will be described further, below) interfere in a target area of the photoresist layer 66. When only the two desired beams are present, the contrast ratio of the resulting grating is optimized and extraneous background light contamination is minimized.

The mask 10 is positioned between the substrate 60 and a light source 72 such that light from the light source 72 is transmitted through the mask 10 and onto the substrate 60. The light source 72 may generate coherent or incoherent light; the wavelength of the light generated is chosen to be compatible with the mask gratings 44, 48, 50 and 54 and the grating which is to be produced on the substrate 60. The light generated is preferably linearly polarized monochromatic collimated light, such as that generated by an argon laser or a filtered UV source.

Figure 2:
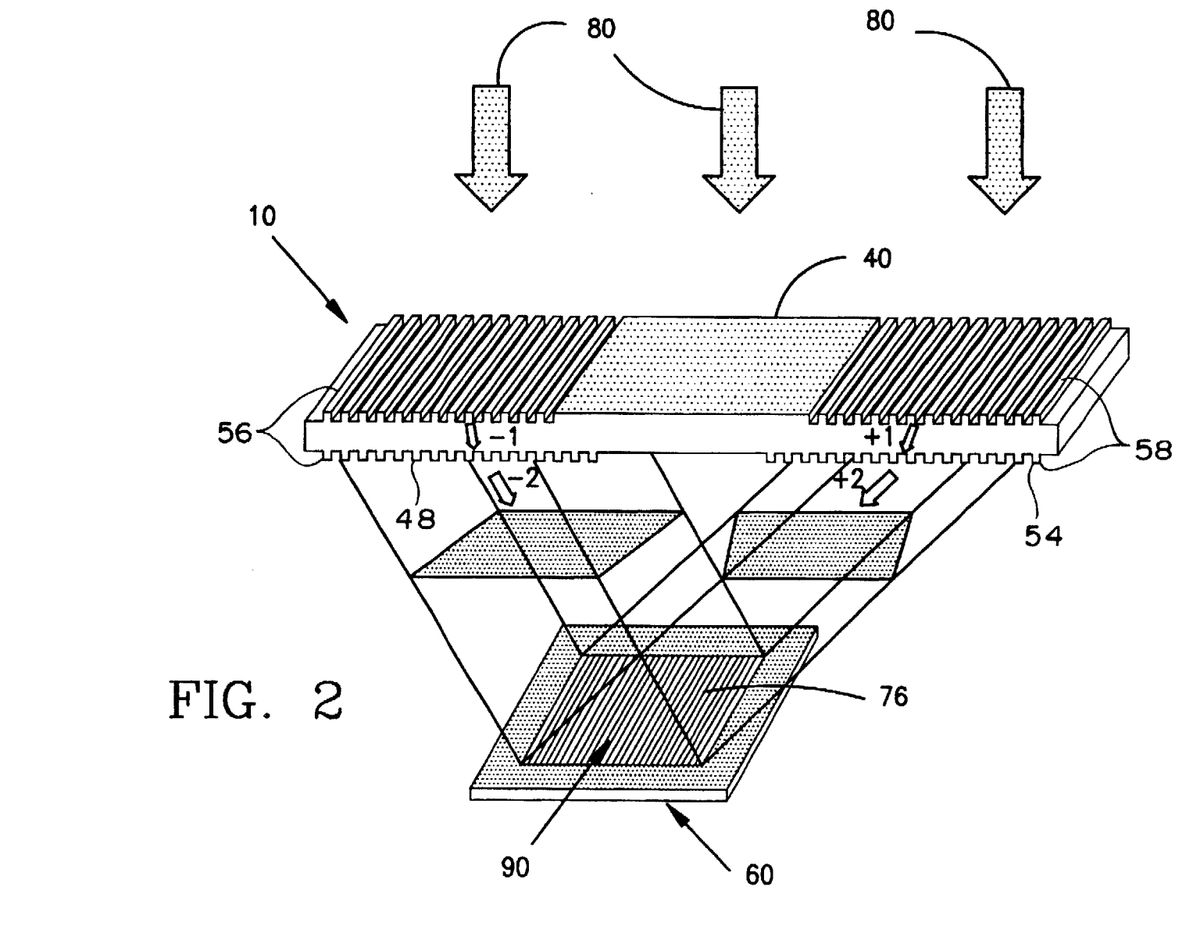
FIG. 2 is a schematic diagram illustrating the mask of FIG. 1 in use.

FIG. 2 illustrates that the size of the central opaque region 40 defines a target exposure area 76 on the substrate 60 by shading the target area 40 from direct illumination by the light source 72. This allows only the interference patterns from the cascaded grating pairs 56 and 58 to reach the target area 76. Preferably, the size of the target area 76 can be from a few millimeters to a centimeter square, and is comparable to the exposure size for an optical stepper.

The actual size of the target area 76 can be determined using the following analysis. In particular, the size of the target area 76 depends on the diffraction angles $\theta_1$ and $\theta_2$, the spacing 70 between the mask 10 and the substrate 60, Z, and the widths of the opaque and grated regions on the mask 10, w and L, respectively. To achieve the desired performance, the spacing Z has to satisfy the following relationship:

$$Z = (w+L)/2[(\Lambda/2\lambda)^2 - 1]^{1/2} \quad (1)$$

where $\Lambda$ is the grating period on the mask 10 and $\lambda$ is the wavelength of the light. Another key quantity is the width T of the target area 76 as specified by the following:

$$T = (w+L)/2[(\Lambda/2\lambda)^2 - 1]^{1/2}[\tan(\theta_2) - \tan(\theta_1)] \quad (2)$$

where $$\tan(\theta_1) = [(\Lambda/\lambda)^2 + 1]^{-1/2}$$

$$\tan(\theta_2) = [\Lambda/2\lambda)^2 + 1]^{-1/2}$$

The linearly polarized monochromatic light from the light source 72 indicated at 80 is first diffracted by the first and third mask gratings 44, 50 on the top surface of the mask 10. Most of the photon energy is contained in the first order diffraction beams labeled as +1 on the right and −1 on the left. Other diffractive beams and the zero order transmitted beams are not shown in FIG. 2 because they do not play a role in the final grating formation. When the +1 and −1 diffraction beams reach the second and fourth mask gratings 48 and 54 on the bottom of the mask 10, two new diffracted beams labeled as +2 and −2 are generated. As shown in FIG. 2, the target area 76 is the area where only the desired +2 and −2 beams can interfere, thereby exposing a grating 90 which has a period of approximately ¼ of the periods in the mask gratings 44, 48, 50 and 54.

If it is desired that the formed grating 90 have a period which is more than four times smaller than the periods of the mask gratings 44, 48, 50 and 54, multiple cascade grating pairs can be used in series to achieve further period reductions, with the only limitations being the wavelength of the incident light 80. In particular, the smallest formed grating pitch that can be obtained is equal to one half of the wavelength of the incident light 80. For instance, using an argon laser, gratings have been formed with a period of approximately 0.25 micron (this corresponds to a 0.125 micron line width). If a filtered UV source is used, 100 nm gratings and 50 nm lines can be formed.

Figure 3:
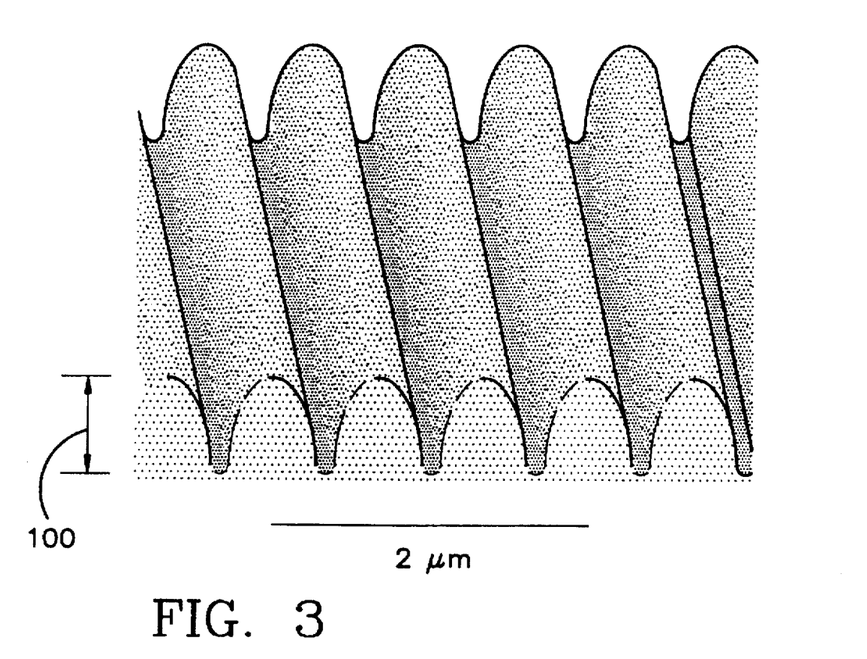
FIG. 3 shows a grating which was formed using the mask of FIG. 1 and a photolithographic fabrication process as viewed under an Atomic Force Microscope (AFM)
Figure 4:
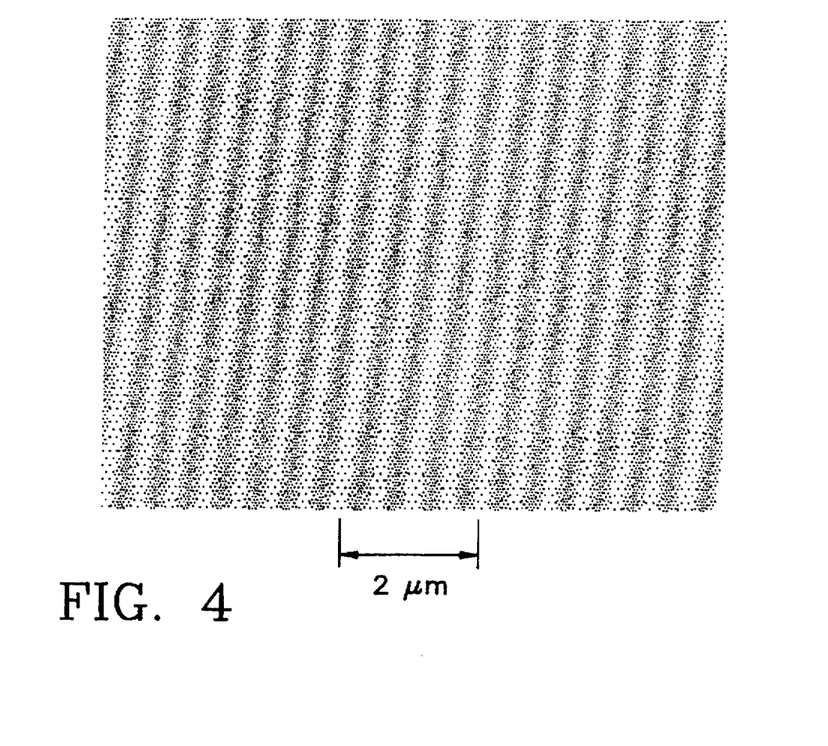
FIG. 4 shows an AFM photograph of gratings formed in an InP substrate.

In an initial experiment, gratings were formed on a photoresist-coated InP sample. The resist profile thus created, as viewed under an Atomic Force Microscope (AFM), is shown in FIG. 3. The resist depth 100 is about 500 Å. The grating pattern was then transferred by etching to an InP substrate (as shown in FIG. 4). The gratings have a 0.5 μm period (0.25 μm line width) formed from 2 μm pitch gratings on the mask 10.

As noted above, there are important applications for the method and apparatus of the present invention in wavelength division multiplexed (WDM) devices. With a slight modification of the design of each of the cascaded grating patterns, a very precise control of the grating period can be achieved.

Figure 5:
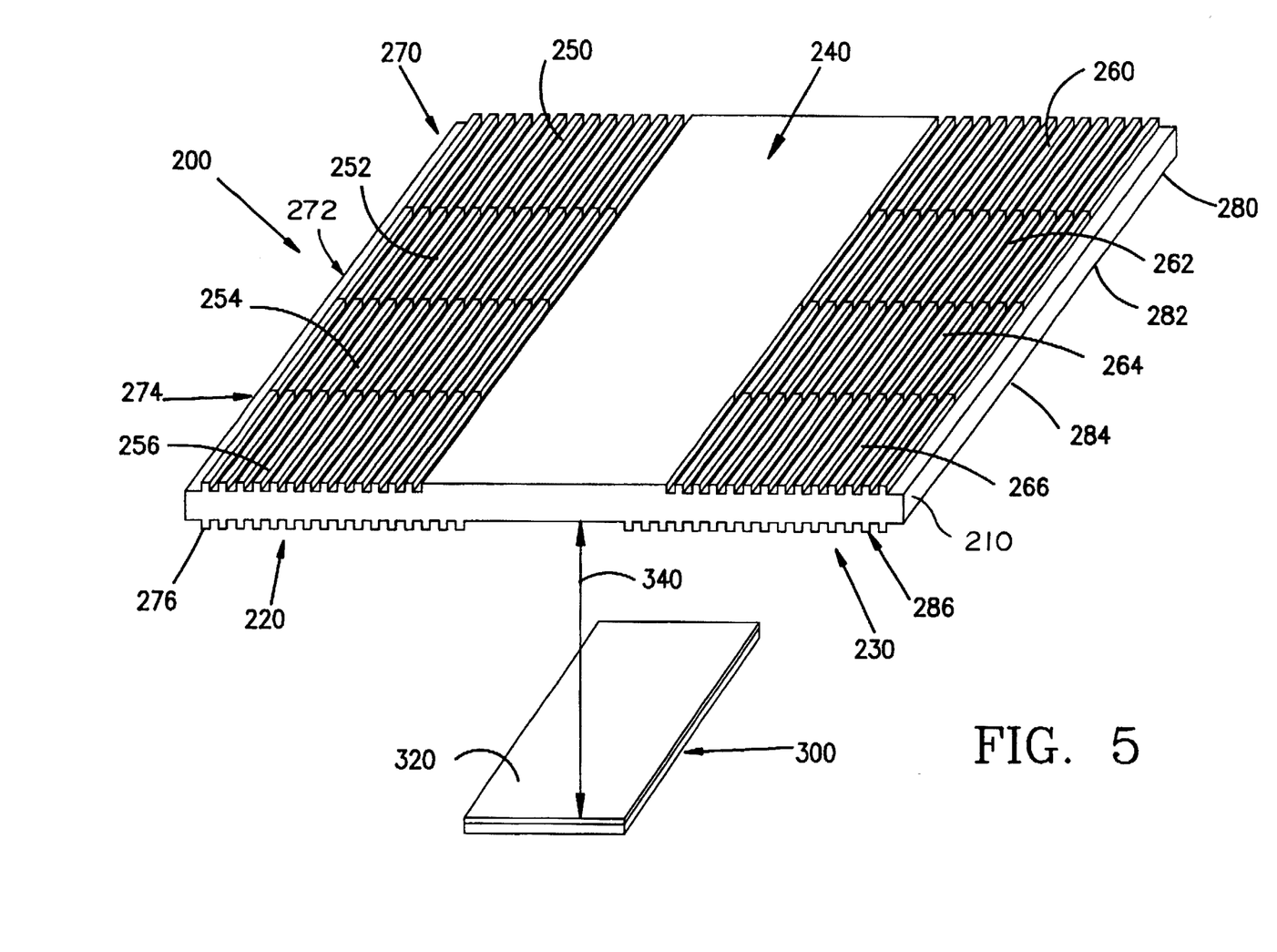
FIG. 5 is a diagram of a second embodiment of the present invention which is adapted for forming WDM device gratings.

Turning now to FIG. 5, there is illustrated a diagram of a second embodiment of the present invention comprising a mask 200 which is specially adapted for use in a WDM application. As in the first embodiment, the mask 200 is also essentially planar and is preferably fabricated from a transparent substrate 210 made from any one of a number of materials such as glass, quartz, magnesium oxide, aluminum nitride, boron nitride, or the like. The mask 200 has first and second transparent end sections 220, 230 which are separated by a central opaque section 240.

The mask 200 is essentially formed from four of the masks 10 of FIG. 1 arranged in a side by side parallel relationship, and these are used for defining four different wavelengths or channels in a WDM application. It will be understood that the mask 200 could be formed of any number of the masks 10 as necessary to accommodate any number of optical channels or wavelengths. Formed on a top surface 248 of the substrate 210 is therefore a group of eight gratings 250–266. Similarly, formed on a bottom surface 268 of the substrate 210, is a second group of eight gratings 270–286 which combine with the first group of gratings 250–266 to form eight cascaded grating pairs.

Figure 6:
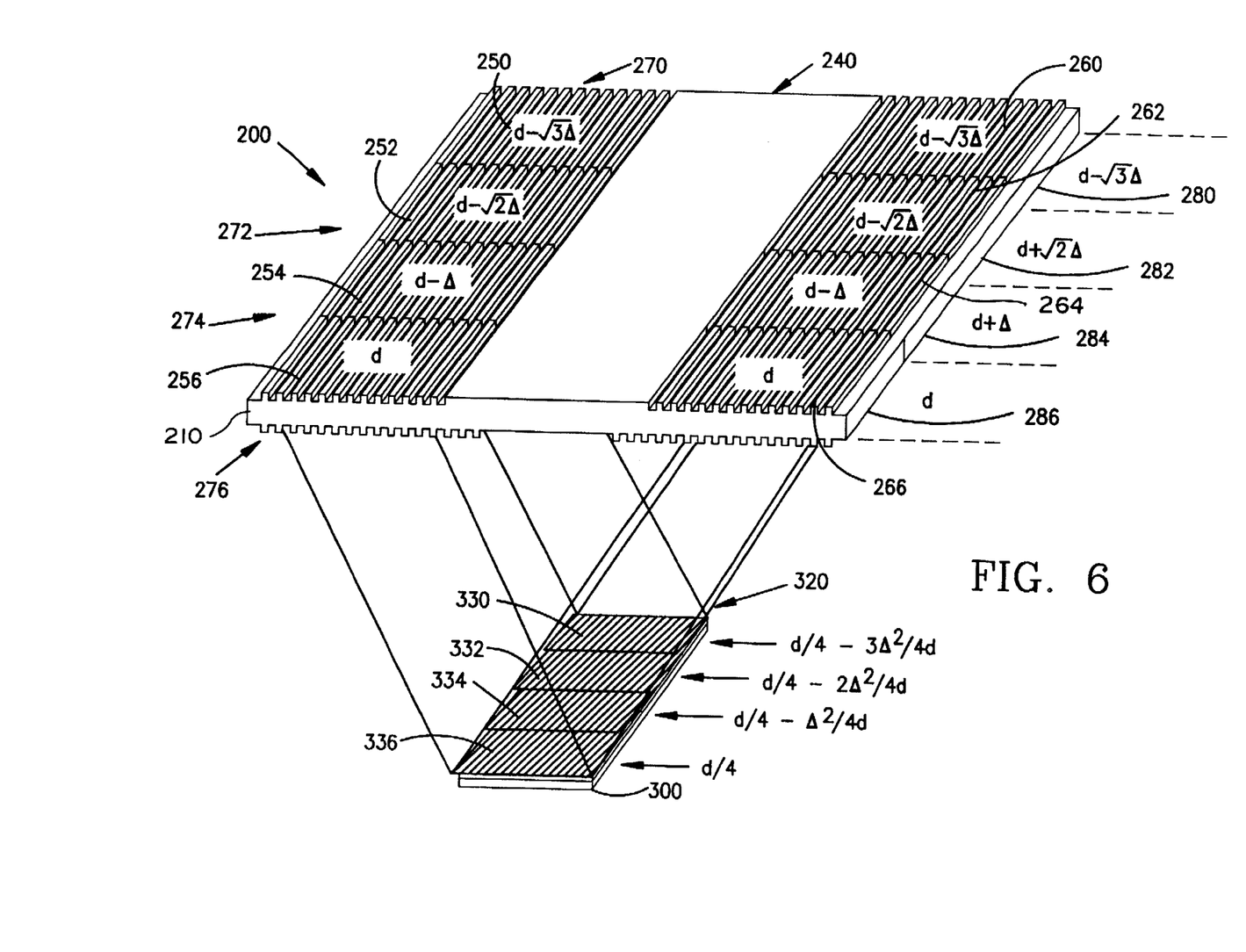
FIG. 6 is a diagram of the second embodiment of the the present invention along with a diagrammatic representation of the grating period relationships for eight cascaded grating pairs for forming four gratings in a substrate.

In use, the mask 200 is positioned over a planar substrate 300 which is coated with a photoresist layer 320. As in the first embodiment, the position of the mask 200 is parallel to the plane of the substrate and spaced apart therefrom by a chosen distance 340. Distance 340 is chosen so that only two beams interfere in the target area. The central opaque section 240 is positioned over the photoresist layer 320 upon which four gratings 330, 332, 334, 336 are to be formed, as shown in FIG. 6.

For a WDM device, the grating periods must be offset slightly from grating to adjacent grating. For example, in order to achieve a 0.3 nm grating period difference between two adjacent devices, a cascaded grating pair period difference of 1.2 nm (assuming a four-fold reduction) is required. This requirement is still far beyond the reach of conventional optical lithography.

This difficulty is overcome by careful choices of grating periods in each cascaded grating pair. The gratings in a given grating pair (except for the first pair) have a slightly different period from one another (say d+Δ for the first and d−Δ for the second) as indicated in FIG. 6. With this arrangement, the final second-order diffraction angle θ will be:

$$\theta = \sin^{-1}\left( \frac{\lambda}{d+\Delta} + \frac{\lambda}{d-\Delta} \right) \tag{3}$$

The resulting grating period D formed on the substrate will thus be changed from d/4 to:

$$D = \frac{\lambda}{2} \; \frac{1}{\sin\theta} = \frac{d}{4} - \frac{\Delta^2}{4d} \tag{4}$$

The above formulas can be applied to form a plurality of n+1 gratings on the substrate, each of which has a grating period which differs from adjacent gratings by an equal amount. In this case, the periods for the sequence of first gratings in each grating pair of the mask will be equal to d, d−Δ, d−√2Δ, . . . , d−√nΔ, while the corresponding sequence of periods for the second grating of each cascaded grating pair will be d, d+Δ, d+√2Δ, . . . , d+√nΔ. Thus, the final resulting grating periods for the sequence of gratings formed on the substrate will be:

$$\frac{d}{4}, \frac{d}{4}-\frac{\Delta^2}{4d}, \frac{d}{4}-\frac{2\Delta^2}{4d}, \frac{d}{4}-\frac{3\Delta^2}{4d}, \ldots, \frac{d}{4}-\frac{n\Delta^2}{4d} \tag{5}$$

With the foregoing arrangement, cascaded grating pairs 256, 276 and 266, 286 form beams of interfering light which impinge solely on target area 336, thus forming a grating with a grating period of d/4. The other cascaded grating pairs work to provide the other formed gratings, each with a distinct period, in the other target zones 334, 332 and 330, as shown in FIG. 6. It should be noted that while the foregoing formulas provide a convenient means by which a sequence of gratings having equally spaced periods can be formed, the gratings obviously need not have equal spaced periods. In fact, in some instances, it is desirable that the gratings purposely not have equally spaced periods to avoid nonlinear optical effects in the optical fibers of a WDM device, such as for example, four way mixing.

It is the quadratic dependence on Δ that allows the value of Δ to be increased to an achievable value for ordinary contemporary UV lithography processes. For example, assume that a typical 10:1 UV stepper is used to transfer the diffraction grating patterns from a master mask plate to the gratings to be cascaded and a 4-fold period reduction is achieved with these cascaded gratings. From Eq. (4), a period difference Δ of 300 Å therefore needs to be formed on the cascaded gratings and a 0.3 μm period difference must be formed in the master mask plate to obtain a 2.25 Å pitch decrement. It should be noted that the 0.3 μm period difference has nothing to do with the resolution of the optical lithography. The minimum achievable increment of the grating period in the master mask plate is limited instead by the precision of an A/D converter utilized by the stepper. This becomes an electronics problem, not an optics problem. With a contemporary optical pattern generator, the increment of the pattern width can be made as small as 0.1 μm. Therefore, a 0.3 μm increment is well within the reach of state-of-the-art equipment. In contrast, using conventional techniques would require an increment of approximately 0.014 μm, and this small an increment is not achievable with current state-of-the-art equipment.

Figure 7:
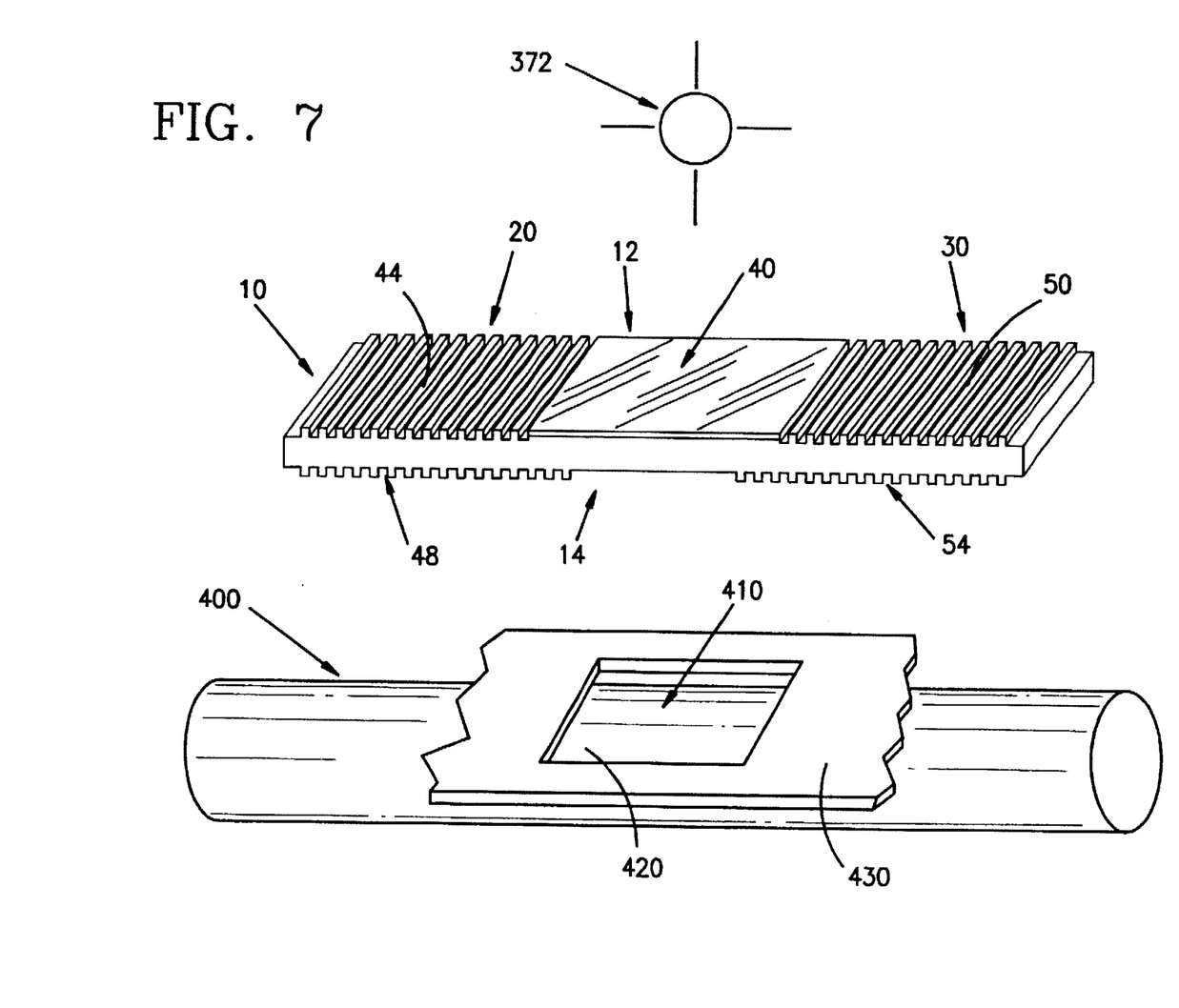
FIG. 7 is a diagram of the mask of FIG. 1 positioned over an optical fiber in which a grating is to be formed directly.

Although the two previously disclosed embodiments of the present invention are described for use with photolithographic fabrication techniques, it should be understood that the present invention is not limited to use with such fabrication techniques. It is also possible to use the present invention to form gratings in fiber optic materials, and the like directly. Permanent or semi-permanent changes in optical properties can be made with photo-illumination, such as UV exposure, for a variety of materials, including optical fiber, dielectrics, semiconductors and polymers. Thus, optical gratings can be formed in these materials using the method and apparatus of the present invention but without use of photoresist and pattern transfer. For example, in the embodiment of FIG. 7, UV light from a source 372 is used with the mask 10 of the FIG. 1 embodiment to form grating in an optical fiber 400. The grating is formed in the fiber 400 in a target area 410 which is visible through an aperture 420 in a fiber mask 430.

The UV source 372 is preferably an excimer laser or a frequency quadrupled Nd-YAG laser which generates UV light at wavelengths of approximately 250 nm and 190 nm. The UV sensitivity of the fiber core can be enhanced by any suitable technique, such as by adding an excessive amount of Germanium thereto. The energy required to make a fiber grating is a function of the wavelength of the light and the composition of the fiber. At a wavelength in the range of 250 nm, a light source of 100 mW optical power can form a grating 1 cm or longer in less than a minute. The efficiency is improved approximately ten-fold if a light source with a wavelength of 190 nm is used.

Figure 8:
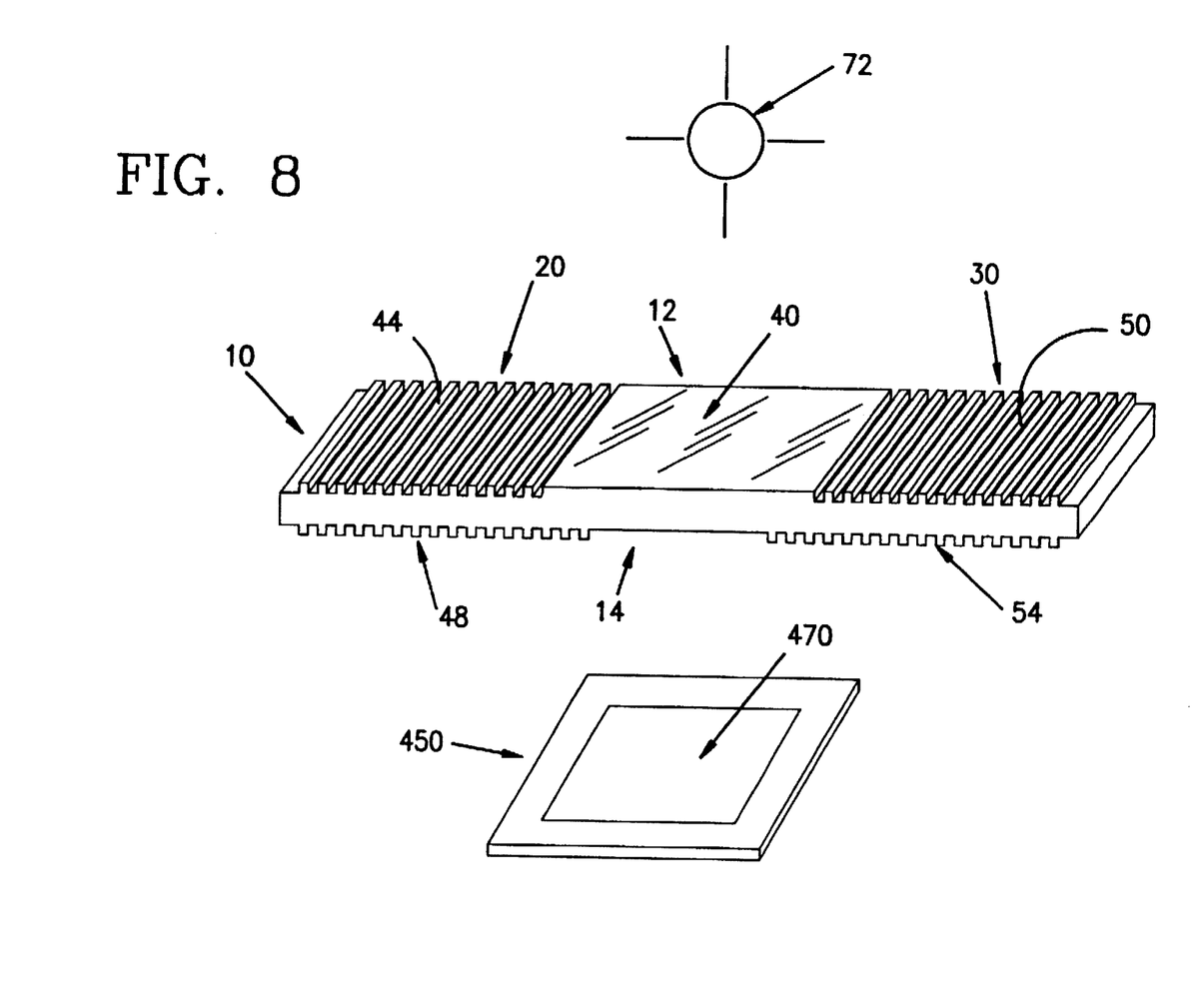
FIG. 8 is a diagram of the mask of FIG. 1 positioned over a thin film of UV sensitive fiber optic material in which a grating is to be formed directly.

If UV sensitive material is deposited on a substrate 450 as a thin film 470, as shown in FIG. 8, the method and apparatus of the present invention can be used to create gratings without affecting the surface topology of the thin film. The grating thus formed in the thin film 470 will be embedded within the film. This method and structure are particularly attractive for a number of applications involving photonic integrated circuits, such as WDM multiplexers and demultiplexers, tunable filters and wavelength selective couplers, to name a few.

Another advantage of employing the cascaded self-induced holography technique of the present invention for forming gratings directly in optical fibers, is that these fabrication techniques are essentially insensitive to background or noise exposure. As a result, the opaque regions employed in the previously disclosed embodiments are not necessary, and a single cascaded grating pair is all that is needed to form each grating in an optical fiber. In this case, the distance between the optical mask containing the cascaded grating pair and the optical fiber in which the grating is to be formed can essentially be reduced to zero. Two embodiments of the present invention which employ such an arrangement are illustrated in FIGS. 9 and 10.

Figure 9:
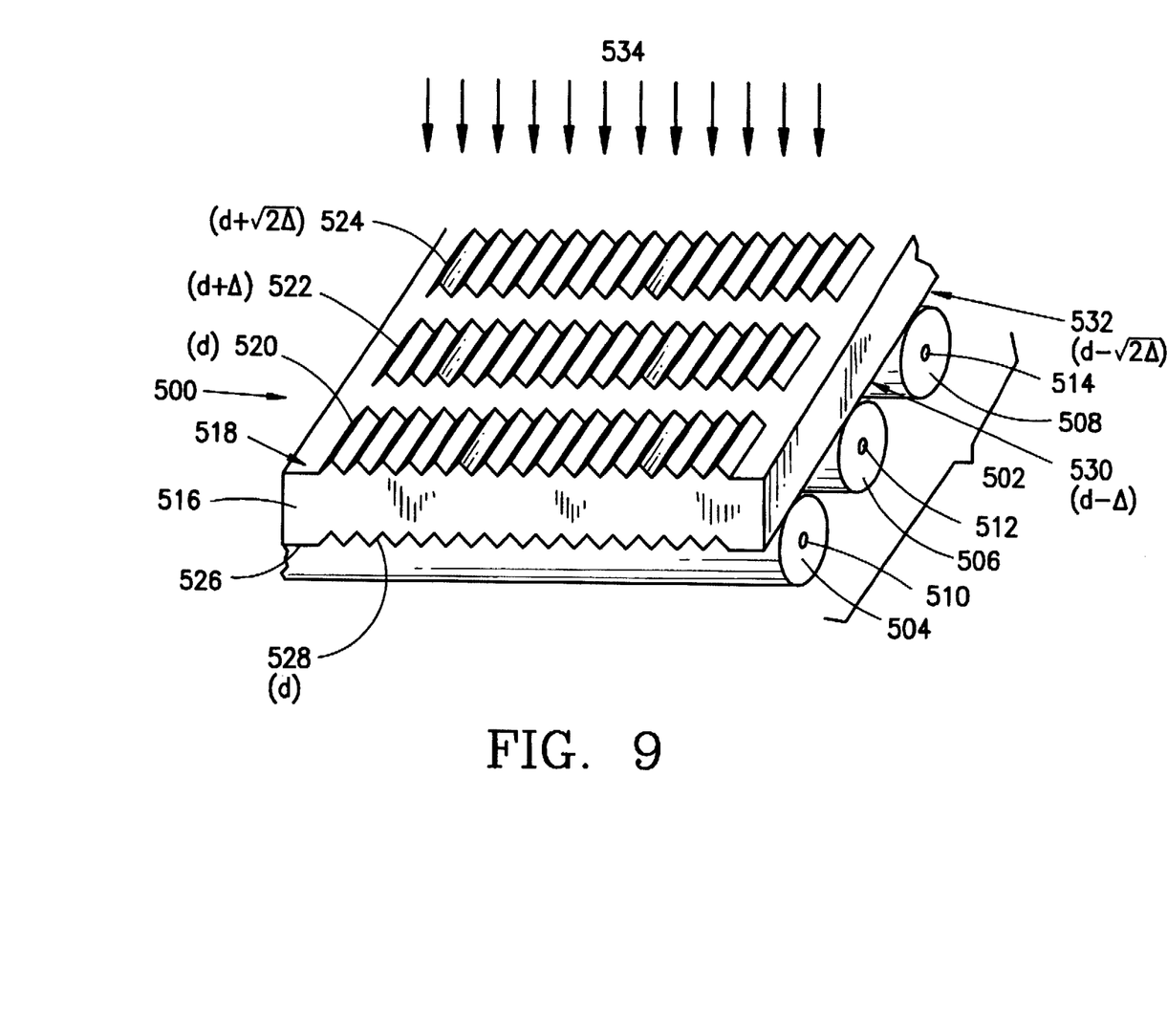
FIG. 9 is a diagrammatic perspective illustration of another preferred embodiment of the present invention comprising an optical mask for use in fabricating WDM devices that is designed to be positioned directly over or adjacent a device on or in which an optical grating is to be formed; and, FIG. 10 is a diagrammatic perspective illustration of yet another embodiment of the present invention modified for use in fabricating a Raman laser amplifier.
Figure 10:
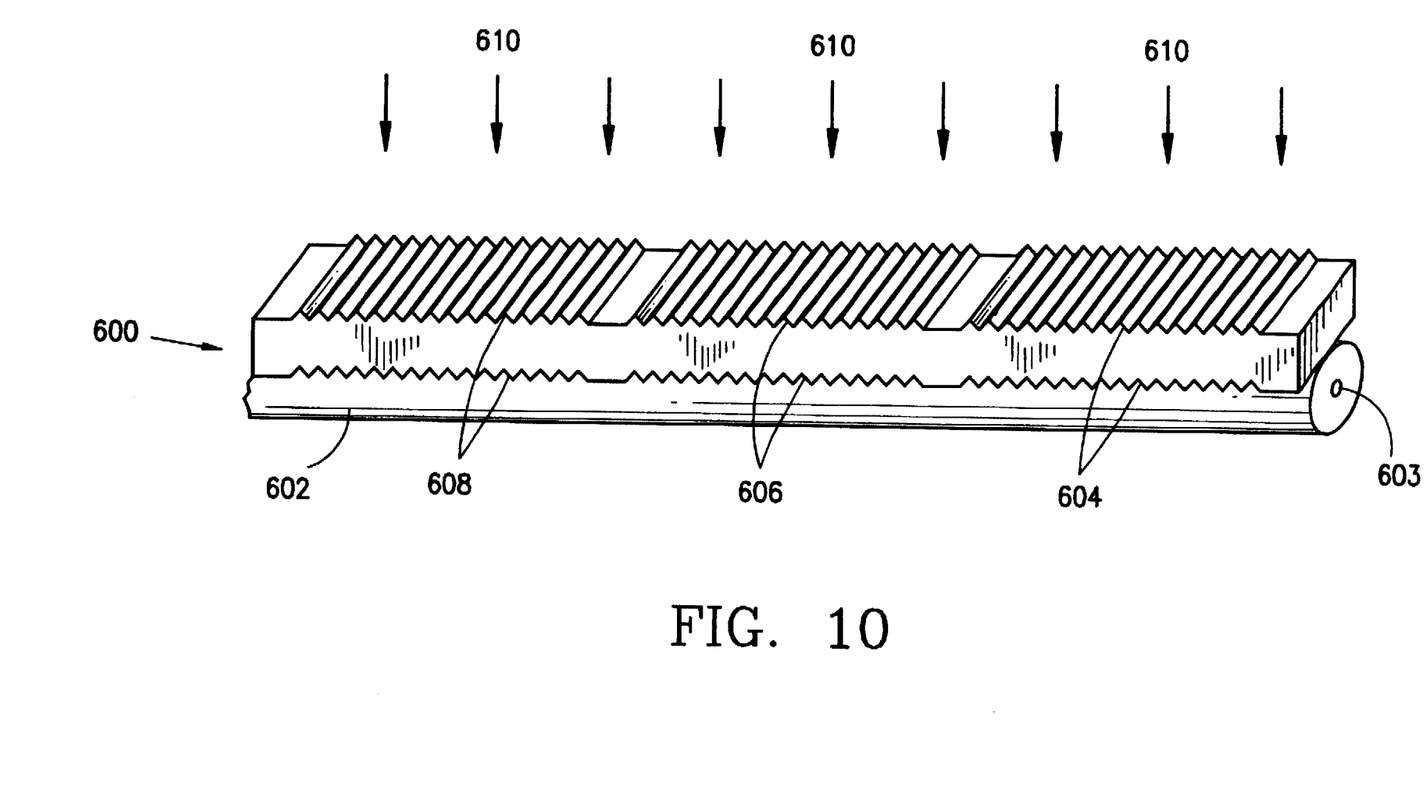

Referencing first FIG. 9, an optical mask 500 is illustrated which is positioned directly above or adjacent an optical fiber array 502 in which a plurality of optical diffraction gratings is to be formed. The optical fiber array 502 can be comprised of any number of optical fibers. For purposes of illustration, first, second and third optical fibers 504, 506 and 508 are illustrated, each of which includes a corresponding core 510, 512 and 514, respectively.

The optical mask 500 is comprised of a substrate 516 having a top surface 518 in which first, second and third diffraction gratings 520, 522 and 524 are formed, and a bottom surface 526 in which fourth, fifth and sixth diffraction gratings 528, 530 and 532 are formed. The first pair of top and bottom gratings 520 and 526 form a first cascaded grating pair which diffract incident UV light 534 onto the fiber core 510 of the first optical fiber 504 for forming an optical diffraction grating therein. As in the second embodiment of the present invention, the second pair of top and bottom gratings 522 and 530 have periods which differ from one another by a small amount, 2Δ. Similarly, the third pair of top and bottom gratings 524 and 532 have periods which differ from one another by 2√2Δ. The second and third cascaded grating pairs are positioned to diffract the incident UV light 534 onto the fiber cores 512 and 514 of the second and third optical fibers 506 and 508, respectively, for forming diffraction gratings therein. As with the embodiment of the invention illustrated in FIG. 6, it will be understood that the period spacings between the adjacent cascading grating pairs can be selected as desired and need not be equal.

The operational principal of the embodiment illustrated in FIG. 9 is otherwise the same as that of the previous embodiments. Namely, the interaction of the diffraction gratings between the top and bottom gratings of each cascaded grating pair causes the resulting grating in the fiber core 524 to have a period up to four times smaller (more than four times if multiple cascaded grating pairs are used in series) than that of either of the top or bottom gratings. Although elimination of the spatial filtering provided by the opaque region inherently causes the fabrication process using the mask 500 to be more sensitive to background or noise exposure, this is not a problem. The only effect of this background exposure on the resulting optical diffraction gratings in the fiber core 524 is a slight increase in the average refractive index thereof, and this has no appreciable effect on any known applications. Thus, the apparent downside of removing the opaque mask is actually no downside at all in this embodiment. Furthermore, removal of the opaque region eliminates the coherence length requirement and the limit on exposure area discussed previously in conjunction with the first embodiment, while all of the attractive features of the invention, such as period reduction and precision period spacing control, are still preserved.

FIGS. 6 and 9 illustrate applications of the present invention for forming diffraction gratings in WDM devices. The technique of the present invention can also be employed to create optical phase shifts and chirped gratings essential to single wavelength laser and narrow line width, tunable lasers, such as for example, Raman laser amplifiers. FIG. 10 illustrates such an embodiment of the present invention in which an optical mask 600 is positioned directly above or adjacent an optical fiber 602 in a core 603 of which a chirp grating is to be formed for fabrication of a fiber Raman laser/amplifier. These devices require a plurality of diffraction gratings with equal spaced periods to provide resonant structures for each phonon energy level of the laser. Therefore, in this embodiment, a plurality of diffraction gratings with equally spaced periods must be formed in the optical fiber 602.

To accomplish this, the mask 600 is comprised of a plurality of cascaded grating pairs 604, 606 and 608, which are positioned along the length of the optical fiber 602. As in the embodiment of FIG. 9, incident UV light 610 passes through each of the cascaded grating pairs of a 604, 606 and 608 to form a corresponding diffraction grating within the core 603 of the optical fiber 602.

It should be understood that although in each of the disclosed embodiments of the present invention, the cascaded grating pairs are shown being formed on the top and bottom surfaces of a mask substrate, respectively, this is not the only manner in which the cascaded grating can be formed. For example, they can also be formed either on the top or bottom surfaces of separate substrates which are positioned one above, or adjacent, the other. Other variations of the invention could include the use of a three-piece mask which includes first and second cascaded gratings that are separately suspended above the target substrate and a separate opaque element which is not in the same plane as the cascaded gratings. The opaque element could nonetheless shade the same region, thus permitting the +2 and −2 beams to interfere and produce a small grating, as before.

Although the invention has been disclosed in terms of a number of preferred embodiments and variations thereon, it will be understood that numerous other modifications and variations could be made thereto without departing from the scope of the invention as defined by the following claims.

What is claimed is:

1. Apparatus for forming diffraction gratings in a material comprising:
   a) a radiation source for projecting radiation onto a radiation sensitive portion of a material to form a pattern therein;
   b) a first cascaded diffraction grating pair for receiving radiation from said radiation source and projecting a first diffraction grating pattern on a material, said first cascaded diffraction grating pair comprising:
      1) a first diffraction grating for forming a first diffracted radiation beam, said first diffraction grating having a first grating period; and
      2) a second diffraction grating for diffracting said first diffracted radiation beam and forming a second diffracted radiation beam, said second diffraction grating having a second grating period, and said first diffraction grating pattern having a grating period which is smaller than said first and second grating periods;
   c) a second cascaded diffraction grating pair positioned in a plane parallel to said first cascaded diffraction grating pair, and comprising:
      1) a third diffraction grating disposed in a plane parallel to said first diffraction grating for receiving radiation from said radiation source and forming a third diffracted radiation beam, said third diffraction grating having a third grating period that is substantially equal to said first grating period; and
      2) a fourth diffraction grating disposed in a plane parallel to said second diffraction grating for diffracting said third diffracted radiation beam and forming a fourth diffracted radiation beam which interferes with said second diffracted radiation beam, thereby forming said first diffraction grating pattern, said fourth diffraction grating having a fourth grating period that is substantially equal to said second grating period; and
   d) spatial filtering means to be positioned between said radiation source and a material in which a diffraction grating is to be formed.

2. The apparatus of claim 1, wherein said first and third diffraction gratings are formed on a top portion of a transparent substrate at first and second ends thereof, respectively; said second and fourth diffraction gratings are disposed on a bottom portion of said substrate at said first and second ends, respectively; and said spatial filtering means comprises an opaque section of said substrate disposed between said first and second ends.

3. The apparatus of claim 1, further comprising:
   e) third and fourth cascaded grating pairs positioned in a plane parallel to one another for receiving radiation from said radiation source and projecting a second diffraction grating pattern on a material, said third and fourth cascaded grating pairs comprising:
      1) a fifth diffraction grating for receiving radiation from said radiation source and forming a fifth diffracted radiation beam, said fifth diffraction grating having a fifth grating period;
      2) a sixth diffraction grating for diffracting said fifth diffracted radiation beam and forming a sixth diffracted radiation beam, said sixth diffraction grating having a sixth grating period;
      3) a seventh diffraction grating positioned in a plane parallel to said fifth diffraction grating for receiving radiation from said radiation source and forming a seventh diffracted radiation beam, said seventh diffraction grating having a seventh grating period that is substantially equal to said fifth grating period; and
      4) an eighth diffraction grating positioned in a plane parallel to said sixth diffraction grating for diffracting said seventh diffracted radiation beam and forming an eighth diffracted radiation beam which interferes with said sixth diffracted radiation beam to form a second diffraction pattern, said eighth diffraction grating having a grating period that is substantially equal to said sixth grating period;

wherein, said fifth and seventh grating periods differ from any of said first through fourth grating periods by a preselected amount, and said sixth and eighth grating periods differ from any of said first through fourth grating periods by an amount equal, but opposite, to said preselected amount;

whereby, said first and second diffraction grating patterns having grating periods which differ from one another.

4. The apparatus of claim 3, wherein said first through fourth grating periods are substantially equal to one another.

5. Apparatus for forming diffraction gratings in a material comprising:
   a) a radiation source for projecting radiation onto a radiation sensitive portion of a material to form a pattern therein;
   b) a first cascaded diffraction grating pair for receiving radiation from said radiation source and projecting a first diffraction grating pattern on a material, said first cascaded diffraction grating pair comprising:
      1) a first diffraction grating for forming a first diffracted radiation beam, said first diffraction grating having a first grating period; and
      2) a second diffraction grating for diffracting said first diffracted radiation beam and forming a second diffracted radiation beam which generates said first diffraction grating pattern, said second diffraction grating having a second grating period, and said first diffraction grating pattern having a grating period which is smaller than said first and second grating periods; and
   c) a second cascaded diffraction grating pair for receiving radiation from said radiation source and projecting a second diffraction grating pattern on a material, said second cascaded diffraction grating pair comprising:
      1) a third diffraction grating for forming a third diffracted radiation beam, said third diffraction grating having a third grating period; and
      2) a fourth diffraction grating for diffracting said third diffracted radiation beam and forming a fourth diffracted radiation beam which generates said second diffraction grating pattern, said fourth diffraction grating having a fourth grating period;

wherein, one of said third or fourth grating periods is larger than said first or second grating periods by a preselected amount, and the other of said third or fourth grating periods is smaller than said first or second grating periods by said preselected amount;

whereby, said first and second diffraction grating patterns having grating periods which differ from one another.

6. The apparatus of claim 5, wherein said material comprises a first optical fiber positioned adjacent said first cascaded diffraction grating pair and having a core for reception of said first diffraction grating pattern, and a second optical fiber positioned adjacent said second cascaded diffraction grating pair, and having a core for reception of said second diffraction grating pattern.

7. The apparatus of claim 5, wherein said material comprises an optical fiber positioned adjacent said first and second cascaded diffraction grating pairs, said optical fiber including a core for receiving said first and second diffraction grating patterns.

8. The apparatus of claim 5, wherein said first and second grating periods are substantially equal to one another.

9. Apparatus for forming diffraction gratings in a material comprising:
   a) a radiation source for projecting radiation onto a radiation sensitive portion of a material to form a pattern therein; and
   b) a first cascaded diffraction grating pair for receiving radiation from said radiation source and projecting a first diffraction grating pattern on a material, said first cascaded diffraction grating pair comprising:
      1) a first diffraction grating for forming a first diffracted radiation beam, said first diffraction grating having a first grating period; and
      2) a second diffraction grating for diffracting said first diffracted radiation beam and forming a second diffracted radiation beam which generates said first diffraction grating pattern, said second diffraction grating having a second grating period which is substantially equal to said first grating period, and said first diffraction grating pattern having a grating period which is smaller than said first and second grating periods.

10. The apparatus of claim 9, further comprising a material in which a diffraction grating is to be formed, said material being positioned adjacent said cascaded diffraction grating to receive said first diffraction grating pattern.

11. The apparatus of claim 10, wherein said material further comprises an optical fiber positioned adjacent said cascaded diffraction grating pair, said optical fiber including a core for receiving said first diffraction grating pattern.

12. Apparatus for forming diffraction gratings in a material comprising:
   a) a radiation source for projecting radiation onto a radiation sensitive portion of a material to form a pattern therein;
   b) a first cascaded diffraction grating pair for receiving radiation from said radiation source and projecting a first diffraction grating pattern on a material, said first cascaded diffraction grating pair comprising:
      1) a first diffraction grating for forming a first diffracted radiation beam, said first diffraction grating having a first grating period; and
      2) a second diffraction grating for diffracting said first diffracted radiation beam and forming a second diffracted radiation beam which generates said first diffraction grating pattern, said second diffraction grating having a second grating period, and said first diffraction grating pattern having a grating period which is smaller than said first and second grating periods; and
   c) a material in which a diffraction grating is to be formed, said material being positioned to receive said first diffraction grating pattern.

13. The apparatus of claim 12, wherein said material is selected from the group comprising a substrate, a thin film and an optical fiber.

14. A method for forming diffraction gratings in a material comprising the steps of:
   a) providing a material in which a diffraction grating is to be formed, said material including a radiation sensitive portion to permit formation of a pattern therein;
   b) providing a radiation source for projecting a beam of radiation on said material;
   c) positioning at least a first cascaded diffraction grating pair between said radiation source and said material, said cascaded diffraction grating pair comprising first and second diffraction gratings having first and second grating periods, respectfully;
   d) directing a beam of radiation from said radiation source through said cascaded diffraction grating pair to form a first diffracted radiation beam which projects a first diffraction grating pattern on said material having a grating period which is smaller than said first or second grating periods; and
   e) forming a diffraction grating in said material corresponding to said diffraction grating pattern.

15. The method of claim 14, wherein said first and second grating periods are selected to be substantially equal to one another.

16. The method of claim 14, wherein the step of positioning a first cascaded grating pair further comprises the steps of:
   1) positioning at least a second cascaded diffraction grating pair between said radiation source and said material in a plane parallel to said first cascaded diffraction grating pair, said second cascaded diffraction grating pair comprising third and fourth diffraction gratings having third and fourth grating periods, respectfully; and
   2) positioning a spatial filtering means between said radiation source and said material; and
   wherein, the step of directing further comprises directing a beam of radiation from said radiation source through said first and second cascaded diffraction grating pairs, thereby forming said first and a second diffracted radiation beams, and projecting said first and second diffracted radiation beams in an interfering manner onto said material, thereby forming said first diffraction pattern thereon, said diffraction pattern having a grating period smaller than any of said first, second, third or fourth grating periods.

17. The method of claim 16, wherein the step of positioning said first and second cascaded grating pairs, and said spatial filtering means further comprises:
   positioning third and fourth cascaded diffraction grating pairs between said radiation source and said material in a plane parallel to one another, said third cascaded diffraction grating pair comprising fifth and sixth diffraction gratings having fifth and sixth grating periods, respectfully, and said fourth cascaded diffraction grating pair comprising seventh and eighth diffraction gratings having seventh and eighth grating periods, respectfully, wherein said fifth and seventh grating periods are selected to be substantially equal to one another and differ by a preselected amount from any of said first through fourth grating periods, and said sixth and eighth grating periods are selected to be substantially equal to one another and differ from any of said first through fourth grating periods by an amount substantially equal, but opposite, to said preselected amount; and
   wherein said step of directing further comprises directing a beam of radiation through said first through fourth cascaded diffraction grating pairs to form said first and second diffracted radiation beams which interfere with one another to form said first diffraction grating pattern in said material, and third and fourth diffracted radiation beams which interfere with one another to form a second diffraction grating pattern in said material, said first and second diffraction grating patterns having grating periods which differ from one another.

18. The method of claim 14, wherein said step of providing at least a first cascaded diffraction grating pair further comprises providing a second cascaded diffraction grating pair including third and fourth diffraction gratings having third and fourth grating periods, respectfully, said third grating period differing from either of said first or second grating periods by a preselected amount, and said fourth grating period differing from either of said first or second grating periods by an amount equal, but opposite, to said preselected amount; and wherein said step of directing further comprises directing a radiation beam through said first and second cascaded diffraction grating pairs to form said first and a second diffraction grating patterns in said material, said first and second diffraction grating patterns having grating periods which differ from one another and are smaller than any of said first through fourth grating periods.

19. The method of claim 18, wherein said step of providing a material further comprises providing an optical fiber including a core, and positioning said optical fiber adjacent said first and second cascaded diffraction grating pairs for reception by said core of said first and second diffraction grating patterns.

20. The method of claim 18, wherein said step of providing a material further comprises providing first and second optical fibers, said first optical fiber having a first core and said second optical fiber having a second core, and positioning said first optical fiber adjacent said first cascaded diffraction grating pair, and said second optical fiber adjacent said second cascaded diffraction grating pair for reception of said first diffraction grating pattern by said first core and said second diffraction grating pattern by said second core.

21. The method of claim 14, wherein the step of providing a material further comprises providing a material selected from the group comprising a substrate, a thin film and an optical fiber.

22. The method of claim 14, wherein the step of providing a material further comprises providing a material having a photoresist layer thereon, and wherein the step of forming further comprises:

1) developing said photoresist layer after said diffraction grating pattern is projected thereon; and 2) etching said material to form said diffraction grating therein from said diffraction grating pattern.

* * * * *